INVENTOR
STANTON E. FISHER

United States Patent Office 3,441,001
Patented Apr. 29, 1969

3,441,001
CORRUGATED ANIMAL TOY
Stanton E. Fisher, Clayton, Mo. (% Sidney B. Ring,
P.O. Box 6825, Brentwood, Mo. 63144)
Filed May 19, 1967, Ser. No. 639,720
Int. Cl. A01k *15/00;* A63h *33/00*
U.S. Cl. 119—29          9 Claims

ABSTRACT OF THE DISCLOSURE

A corrugated rawhide animal toy, preferably formed from reconstituted rawhide particles.

---

This invention relates to a corrugated rawhide animal toy.

In the highly competitive pet market, it is desirable to produce a product which is intrinsically appealing to animals such as dogs, has an interesting shape, has kinetic capabilities, has sufficient strength to be long lasting, is harmless to animals, does little or no damage to the owner's possessions, provides continued amusement and exercise for the dog, provides pacification to the animal, etc. Stated another way, in today's highly competitive pet market, an animal toy must have a maximum of positive and a minimum of negative factors.

I have now devised a corrugated rawhide animal toy which has the above characteristics. It is intrinsically appealing because, being made of rawhide, it has a taste and odor that dogs love, it has an interesting shape which has kinetic capabilities since the dog's paw by acting on the terminal open U corrugation can continually turn or flip the toy thus affording continued amusement in the nature of a game, has a high degree of strength because of its corrugated configuration and is thus long lasting, is harmless to animals, does no damage to the owner's possessions since it is non-staining.

The invention will be apparent from the following detailed description which is to be read in conjunction with the accompanying drawings forming a part hereof wherein.

The term "corrugated" relates to a configuration having alternate ridges and grooves, etc. In its minimum corrugation content it should have at least one ridge and one groove. Although the height and breadth of each ridge and groove can vary widely, for example from about ¼ inch to two inches or more or less in certain instances, in the preferred embodiment it is preferred that both height and breadth be substantially the same for each ridge and groove, for example about one inch (±¼ inch). In the most preferred embodiment the corrugation has a sine wave configuration.

Since one of the appeals of this animal toy is kinetic, it is highly desirable to have an even number of ridges and grooves so that both sides of the corrugation contain terminal grooves. For example, if the corrugated toy has 3, 5, 7, 9, etc. ridge-groove units (a ridge or a groove are each individually considered as one unit) then all terminal grooves will be on one side of the toy. Therefore, if all terminal grooves are facing down, the toy cannot be flipped by the dog's paw and is in essence kinetically dead. However, if the corrugated toy has an even number of units such as 2, 4, 6, 8, etc., then regardless of which side is up, the toy having a terminal grove can be flipped, i.e. there is no dead side. The flipping action of the corrugated animal toy can be used as a game to amuse the animal.

Figure 1:
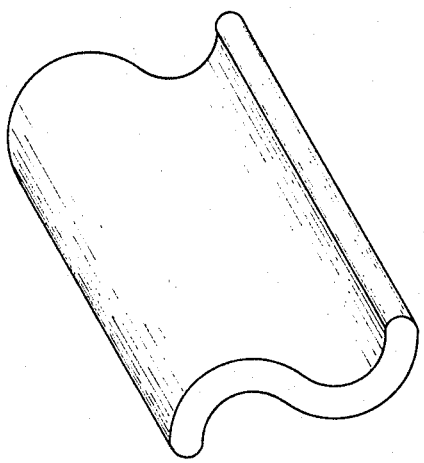
FIGURE 1 is a perspective view of the preferred embodiment of this invention.

Since the ease of flipping is enhanced by as few units as possible, the preferred embodiment has two units, i.e. one ridge and one groove as shown in FIGURE 1.

The dimensions of the corrugated product can vary widely depending on the desired product. It may, for example, have a thickness of about ⅟₁₆–½ inch such as about ⅛–⅜ inch, but preferably ¼ inch. Its length and width may be of any suitable dimension consistent with its kinetic properties. In practice the toy is generally from about 1 to 6 inches wide and from 3 to 12 inches long, but preferably 2 to 4 inches wide and from 4 to 6 inches long. The number of units can also vary widely such as from two to ten or more units.

The corrugated rawhide animal toy can be prepared according to the methods described in U.S. Patent 3,123,047, i.e. by compacting and reconstituting rawhide particles and shaping by any suitable means such as by molding, extrusion, etc. This patent is by reference incorporated into the present application as if part hereof.

The following examples are presented for purposes of illustration and not of limitation.

Example 1

Rawhide was comminuated by grinding, and while wet, placed in a mold of corrugated configuration. The shaped product was removed and dried to yield a corrugated rawhide animal toy and is shown in FIGURE 1 having two corrugation units, being about ½ inch thick, about 5 inches long and 2 inches wide.

Example 2

Figure 2:
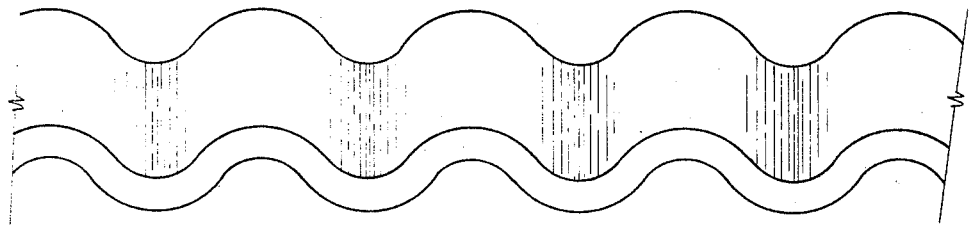
FIGURE 2 is a perspective view of a cut-away length of a plurality of corrugated units which may be cut to the desired length.

Example 1 was repeated except that a sheet of compacted rawhide particles was continually extruded and made to conform to the corrugated configuration as shown in FIGURE 2. The corrugated sheet was then cut into desired lengths, for example 2 corrugation units, 4 corrugation units, 6 corrugation units, etc.

Example 3

Sheets of rawhide are shaped while wet into a corrugated configuration and allowed to dry in this shape to yield a product having the configuration of FIGURE 1.

Although one may add other components to the rawhide prior to molding such as adhesives, resins, etc., the product should preferably contain little, if any, component other than rawhide. However, if desired, one may combine plastics, such as polystyrene, nylon, etc. with rawhide particles and mold a corrugated product.

The use of rawhide is critical to this invention. Rawhide is animal skin or hide which has been dehaired and then dried. No tanning is involved in its manufacture. Suitable definitions of rawhide can be found in many texts on leather, for example, in the Hide, Leather and Shoe Encyclopedia.

While certain representative embodiments and details have been shown for purposes of illustration, it will be apparent to those skilled in the art that various modifications may be made herein without departing from the spirit or scope of this invention.

Having thus described my invention what I claim as new and desire to obtain by Letters Patent is:

1. A corrugated rawhide animal toy comprising a sheet having a series of alternate ridges and grooves.

2. The corrugated rawhide animal toy of claim 1 which comprises small rawhide particles closely compacted and reconstituted.

3. The corrugated rawhide animal toy of claim 1 having an even number of corrugations.

4. The corrugated rawhide animal toy of claim 2 having an even number of corrugations.

5. The corrugated rawhide animal toy of claim 3 having two corrugations.

6. The corrugated rawhide animal toy of claim 4 having two corrugations.

7. A method of flipping the corrugated rawhide animal toy of claim 1 which comprises hitting the terminal open corrugation.

8. A method of flipping the corrugated rawhide animal toy of claim 3 which comprises hitting the terminal open corrugation.

9. A method of flipping the corrugated rawhide animal toy of claim 5 which comprises hitting the terminal open corrugation.

References Cited

UNITED STATES PATENTS

| | | | |
|---|---|---|---|
| 1,149,170 | 8/1915 | Allis | 119—29.5 |
| 2,185,547 | 1/1940 | Fowler | 46—1 |
| 2,988,045 | 6/1961 | Fisher | 119—29 |
| 3,123,047 | 3/1964 | Fisher | 119—29.5 |
| 3,198,173 | 8/1965 | Fisher | 119—29 |
| 3,368,528 | 2/1968 | Ganoe | 119—29 |

ALDRICH F. MEDBERRY, *Primary Examiner.*

U.S. Cl. X.R.

46—1